Dec. 30, 1952    G. P. A. ALLEC    2,623,287
FIRE-CONTROL APPARATUS FOR DIRECT-AIMING
ANTIAIRCRAFT FIREARMS
Filed Jan. 10, 1941    6 Sheets-Sheet 4

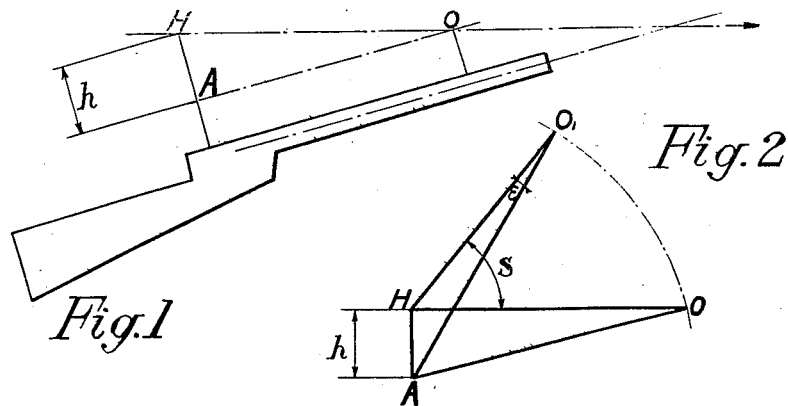
Fig. 1
Fig. 2
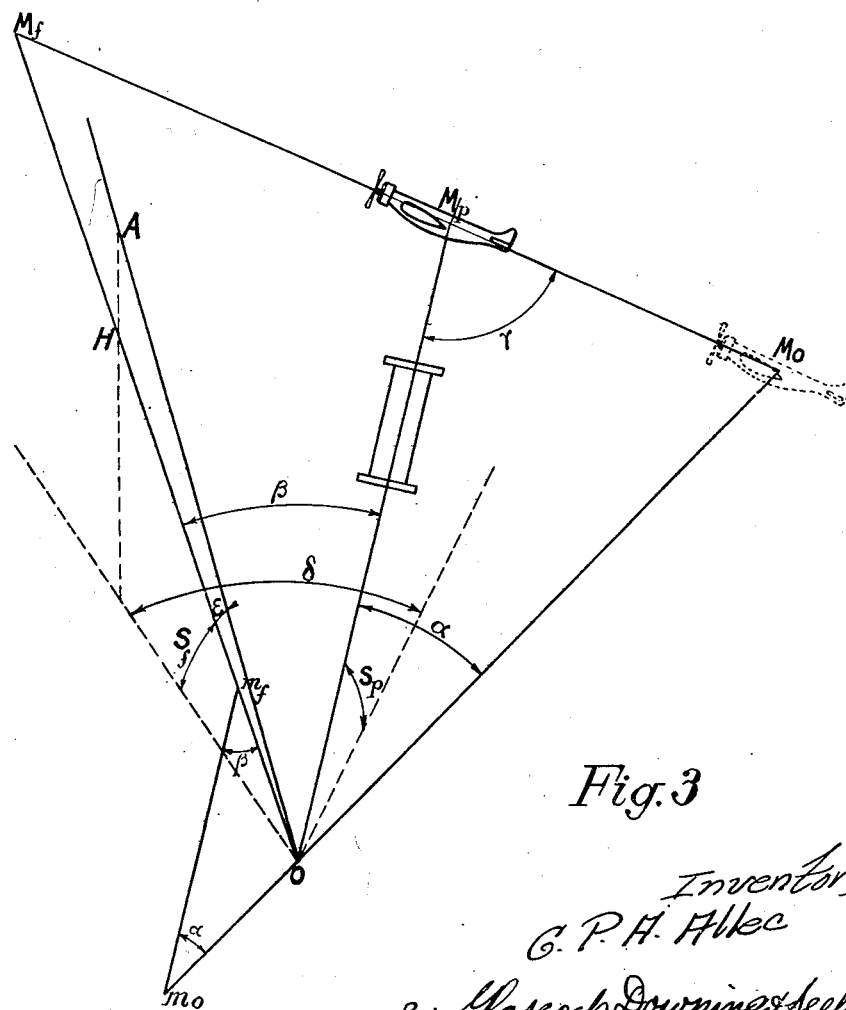
Fig. 3

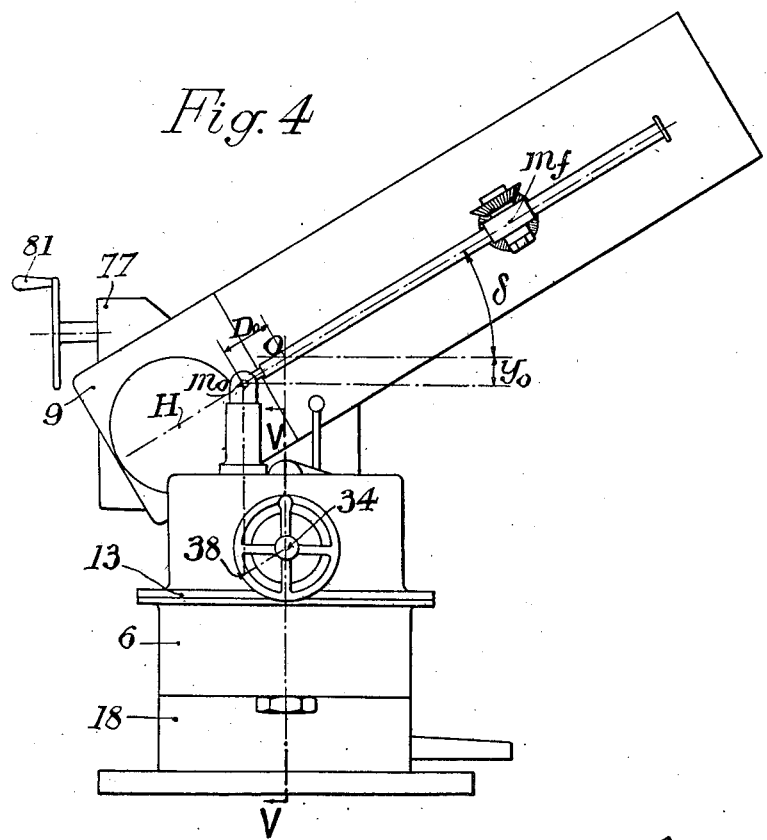
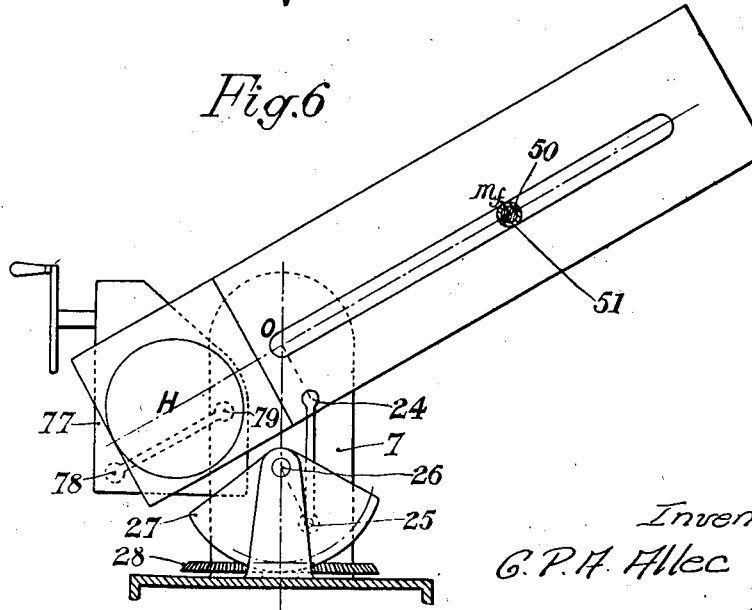

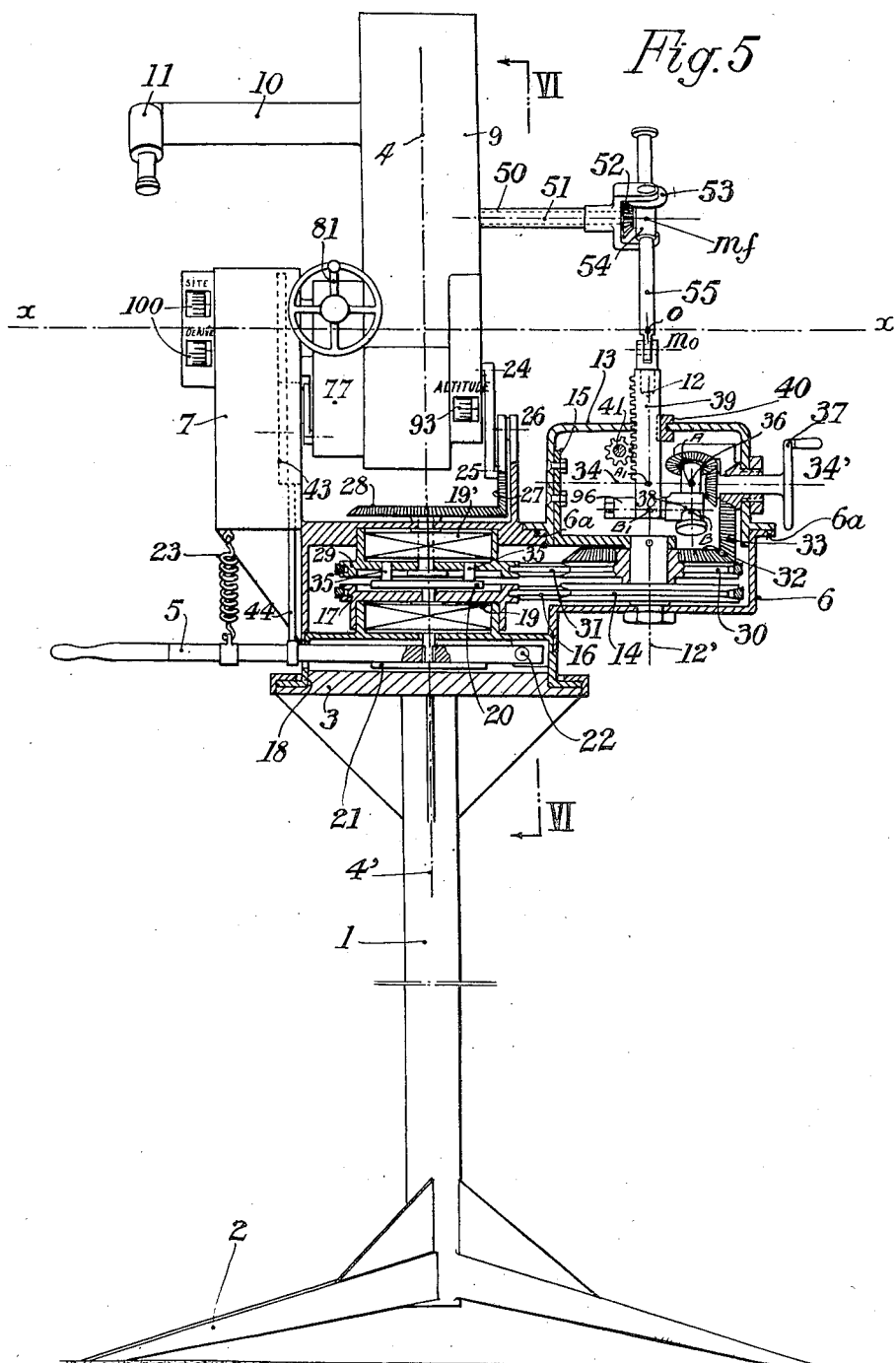

Inventor,
G. P. A. Allec
by: Glascock Downing & Seebold
Attys.

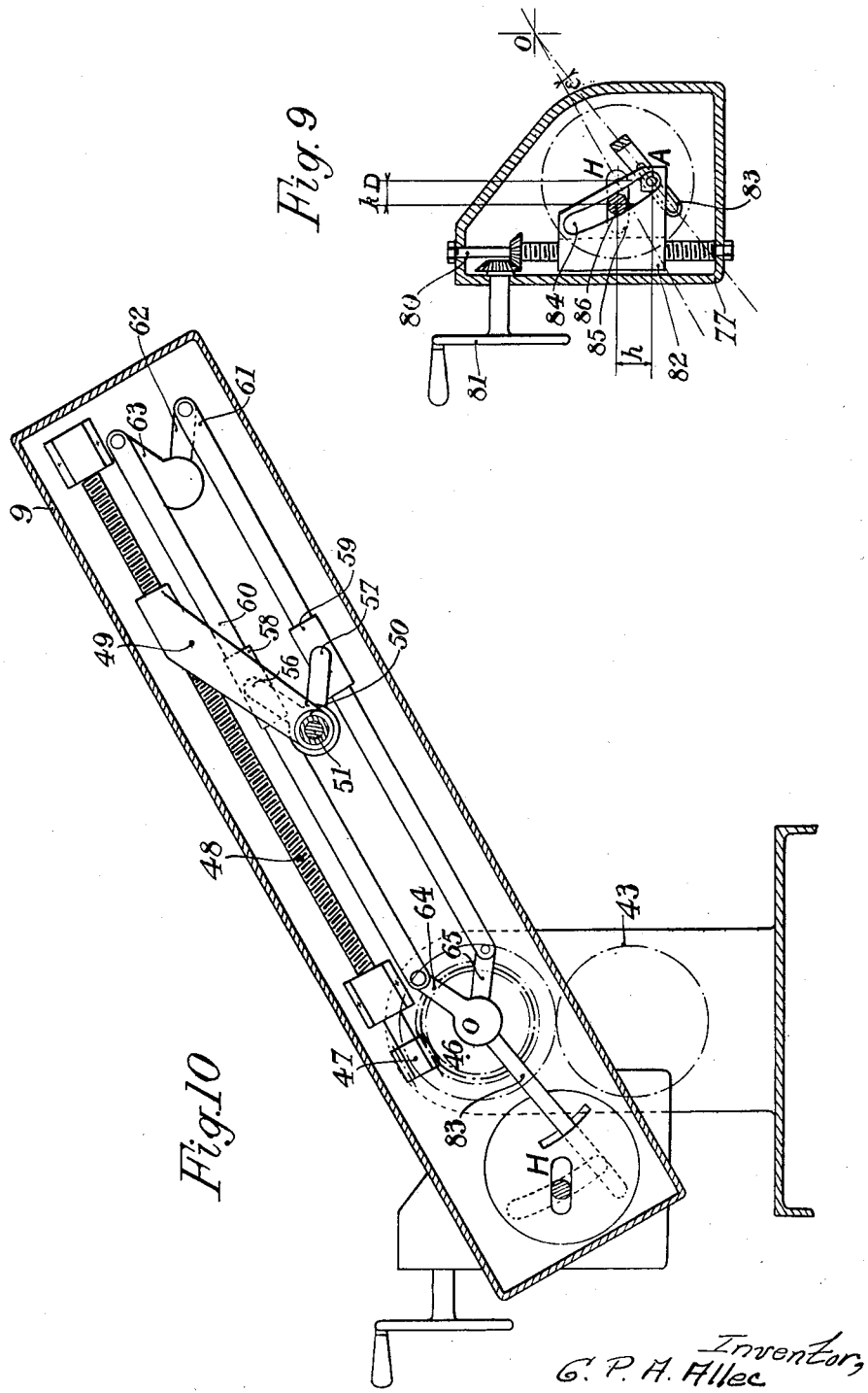

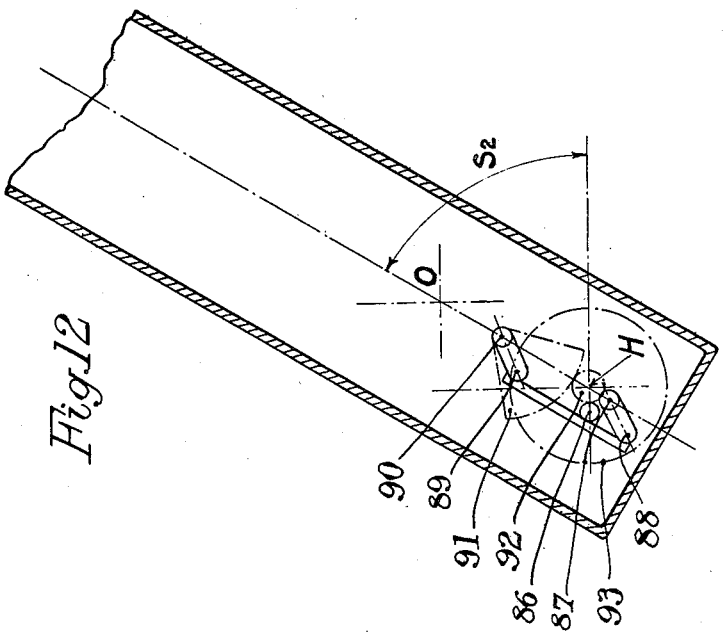
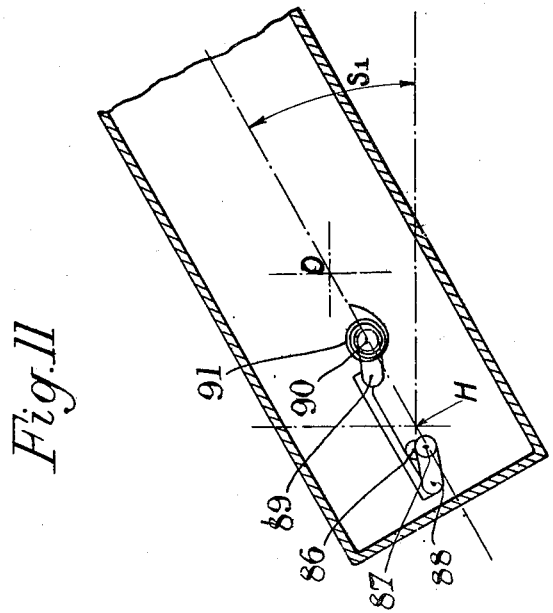
Fig.12
Fig.11
Inventor,
G. P. A. Allec
By: Glascock Downing Seebol
Attys.

Patented Dec. 30, 1952

2,623,287

UNITED STATES PATENT OFFICE 2,623,287

FIRE-CONTROL APPARATUS FOR DIRECT-AIMING ANTIAIRCRAFT FIREARMS

Georges Pierre André Allec, Paris, France; vested in the Attorney General of the United States Application January 10, 1941, Serial No. 374,007
In France August 8, 1939

Sections 3 and 14, Public Law 690, August 8, 1946
Patent expires August 8, 1959

10 Claims. (Cl. 33—49)

Direct-aiming fire-arms generally are provided with a finder, that is, a view-finding glass the optical axis of which can be set at an angle both elevationally and directionally with respect to the axis of the barrel. With correct angular settings the gunner will hit the aircraft aimed at by firing at the moment he sees the same centered in the finder just as in the case of a fixed target.

The fire-control apparatus which provides the subject-matter of this invention is intended to give the values of said elevational and directional angle settings by taking into account two series of corrections, namely:

The correction involved by the fact that the trajectory of the projectile is a curved one (range correction);

The correction involved by the fact that the target moves during the course of said projectile (motion correction).

For a better understanding of the apparatus according to the invention, the principle will first be explained upon which it is based, upon which a practical embodiment of the same will be disclosed.

In the appended drawings, Figures 1, 2 and 3 relate to the explanation of the principle and Figures 4-12 to the embodiment of an apparatus according to the invention.

Figure 4 is a side view.

Figure 5 is a front view with a fractional cross-section taken on line V—V in Fig. 4.

Figure 6 is a fractional cross-sectional view taken on line VI—VI in Fig. 5.

Figure 9 is a fractional cross-sectional view taken on line IX—IX in Fig. 7.

Figures 10, 11 and 12 are fractional cross-sectional views taken on line X—X in Fig. 7.

Figure 7:
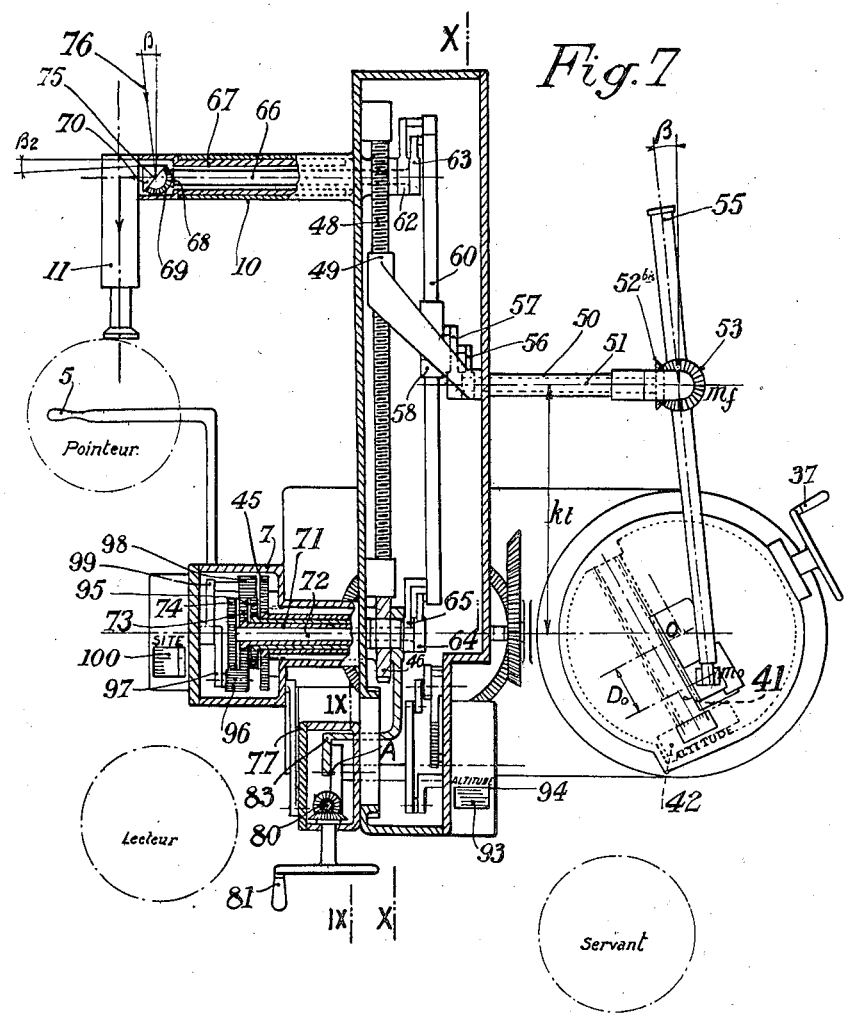
Figure 7 is a partly cross-sectional plan view.

The principle of the apparatus is as follows:

The distance correction (Figs. 1 and 2) is obtained by the contrivance well-known as the "leaf sight."

In those arms which are fired at land targets (Fig. 1) the angle of sight, i. e. the angle between the axis of the barrel and the line of sight, is determined by a distance $h$ taken normally to the barrel, the value of $h$ being a function of the range D.

In firing at aerial targets, both theory and practice have shown that if the leaf sight $h$, once set for a distance corresponding to the range D, be kept vertical (Fig. 2) regardless of the angle of position (i. e. the angle between the line of sight and the horizontal plane), the trajectory of the projectile will pass through that point in the sky which lies at the distance D from the gunner on the line of sight.

The distance correction thus depends only on the distance of the target, or on its altitude.

The motion correction depends upon the flying characteristics of the target. An anti-aircraft fire-control apparatus acts only to express in angular settings those data which are indexed therein: distance (or altitude), direction of travel, flying speed, etc. However elaborate a fire-control apparatus may be its usefulness depends absolutely upon the correctness of said data.

On the other hand, in order to determine the correct values of said data, one must resort to such auxiliary apparatus as range- (or height-), course-, speed-finders and the like, which necessitates a certain time for their transmission to the fire-control apparatus. Now, in anti-aircraft fire, delays should practically be reduced to a minimum as the time during which a land weapon can efficiently be employed against an aircraft is extremely short.

For all these reasons it is advisable to reduce as much as possible the number of necessary data.

In the fire-control apparatus according to the invention the only data which is necessary is the distance of the target or its altitude:

Let O designate the gun muzzle (Fig. 3), $M_o$ the position occupied by the airplane in space at a given moment taken as the time origin, $M_p$ its present position $t$ seconds after it occupied position $M_o$ and $M_f$ its future position, that is, the one it will occupy after a time $T_f$ corresponding to the duration of the course of the projectile for distance $$\overline{OM_f} = D_f$$

If V be the true speed of the airplane (taking into account the influence of the wind), then:

$$\overline{M_oM_p} = V.t$$

$$\overline{M_pM_f} = V.T_f$$

Taking on the direction $\overline{M_oO}$ a length $\overline{Om_o}$ equal to $k.D_o$, $k$ being a constant coefficient and $D_o$ being the length $OM_o$, and drawing a line $\overline{m_om_f}$ parallel to $\overline{OM_p}$, there obtains in triangle $Om_om_f$:

$$\frac{\overline{Om_f}}{\overline{Om_o}} = \frac{\sin \alpha}{\sin \beta} \quad \text{or} \quad \overline{Om_f} = K.D_o \frac{\sin \alpha}{\sin \beta} \quad (1)$$

In triangle $OM_oM_p$:

$$\frac{\sin \alpha}{\sin \gamma}=\frac{\overline{M_oM_p}}{\overline{OM_o}} \quad \text{or} \quad \frac{\sin \alpha}{\sin \gamma}=\frac{V.t}{D_o} \quad (2)$$

In triangle $OM_pM_f$:

$$\frac{\sin \gamma}{\sin \beta}=\frac{\overline{OM_f}}{\overline{M_pM_f}}=\frac{D_f}{V.T_f} \quad \text{or} \quad \frac{\sin \gamma}{\sin \beta}=\frac{1}{V}\cdot\frac{D_f}{T_f} \quad (3)$$

Multiplying Equations 2 and 3 member to member gives:

$$\frac{\sin \alpha}{\sin \beta}=\frac{t}{D_o}\cdot\frac{D_f}{T_f}$$

and by taking this value into Equation 1:

$$\overline{Om_f}=k.t.\frac{D_f}{T_f}$$

an expression in which V is eliminated.

The coefficient $$\frac{D_f}{T_f}$$

which can be called the mean speed of the projectile on its trajectory, is a function of the angle of position and the distance.

In the embodiment described hereinafter by way of example the case is assumed of automatic fire-arms operating by the so-called "bunch firing method," which is characterized by the fact that a barrier is established in front of the airplane and maintained during the whole time of its passage. Beginning with the first shot, aiming is discontinued and the arm is kept motionless during the squall.

When firing by this method a constant approximative value is found sufficient for the mean speed $$\frac{D_f}{T_f}$$

of the projectile. This gives finally:

$$\overline{Om_f}=kt$$

Diagrammatically the fire-control apparatus comprises an arm $\overline{Om_o}$ fulcrummed at point O and having a length $kD_o$ and adapted to constantly retain a fixed direction in space from the time origin $t=0$; an arm $\overline{Om_f}$ fulcrummed at point O and having a length $k_1t$; a glass the optical axis of which is at all times parallel to $\overline{m_om_f}$. If the glass is then directed towards the airplane, the direction of arm $\overline{Om_f}$ is the one which the barrel must occupy, with deduction of the angle of sight.

The control apparatus thus determines the corrections geometrically; it follows that while allowing to aim continuously in time the control apparatus involves no such continuousness which sometimes may be difficult to obtain on account of smoke, clouds, etc. In other words, whenever the gunner sees the aerial target at the centre of its glass the corrections are given.

This invention consequently has for its object an anti-aircraft fire-control apparatus for direct-aiming fire-arms which necessitates the knowledge of one single datum: the distance or altitude of the airplane, and which automatically gives the correct angular settings by sightings which need not be continuous, as a result of the construction of a correction triangle the sides of which are parallel respectively to:

The line leading from the glass to a position of origin of the airplane,

The line leading from the glass to the present position of the airplane,

The line leading from the glass to the future position of the airplane.

In the embodiment shown by way of example in Figs. 4 to 12 the apparatus is mounted on a pedestal comprising a column 1 provided with a tripod 2. Arranged at the upper end of the column is a table 3 providing the base and centre of the whole apparatus and adapted to be rotated about the vertical axis 4—4' by the gunner operating horizontally with his left hand on arm 5 (Fig. 7).

The apparatus proper comprises primarily a casing 6 having a lateral extension 7 provided with a bore having a horizontal axis $x$—$x$ in which a cylindrical box 9 is fulcrumed which the gunner can operate with his right hand by acting vertically upon arm 10.

By the combination of both operations the gunner is able to follow any aerial target through the telescope or glass 11 rigid with box 9 and the optical axis of which is parallel to the axis of the latter.

Casing 6 is provided with a bore having a vertical axis 12, 12' which meets at point O with the axis $x$—$x$ and a circular bearing 6a in which a box 13 is adapted to rotate; said box serves to provide the virtual vector $\overline{Om_o}$, proportional in length to $D_o$, which can retain a fixed direction in space regardless of the movements of the apparatus both about axis 4—4' and axis O as a result of the gunner following the airplane through the glass.

For that purpose, the moving box 13 is made rigid with a pulley 14 by a member 15. Said pulley 14 is connected by a belt 16 or preferably through a positive drive such as a sprocket chain with a pulley 17 having the same diameter and mounted on a centering arrangement having 4, 4' for its axis and carried by a bottom cover 18 secured to casing 6. Pulley 17 is connected to said cover 18 by a spring box 19 mounted in such manner that every rotational movement of pulley 17 about axis 4, 4' with respect to cover 18 will tension the spring irrespective of the direction of rotation.

Slidably mounted in a bore in pulley 17 and spring box 19 is a disc system 20, 21 adapted to be lowered and raised by the vertical operation of arm 5 fulcrumed about the shaft 22 rigid with cover 18.

When arm 5 is lowered the disc 21 brought into contact with table 3 is stopped; the pulley 17 which at that time is in engagement with disc 20 is also stopped. The pulley 17 and pulley 14 are connected for rotation by belt 16 in such a manner that they always turn by the same angle in the same direction. When arm 5 is in the upper position of Fig. 5 the two pulleys 17 and 14 and also box 13 are engaged in rotating movement of casing 6 as if they were rigid with the casing. When arm 5 is pushed downward to tension spring 23, these two pulleys and in consequence box 13 are brought to a standstill from rotation about their axis in such a manner that box 3 when it is taken along in the movement of casing 6 maintains an angular fixed orientation by moving in a circular movement about axis 4, 4'. During the movement casing 6 turns about pulley 17 stretching the spiral spring 19 so that once arm 5 is released and comes back to its upper position by the action of tension spring 23 the box 13 returns to its initial position in respect to casing 6.

The rotating movement of box 9 about axis $x, x$ actuates on the other hand interior elements in box 13 by means of:

A link 24, 25 the length of which is equal to the distance O–26 from axis O to the axis 26 of a bevel quadrant 27;

A bevel gear set 27, 28;

A spring box 19' operating in the same manner as spring box 19;

A pair of equal pulleys 29, 30 connected through a belt 31;

A bevel gear set 32, 33.

The bevel gear trains 27, 28 and 32, 33 are in the ratio 1, so that the bevel quadrant 33 is rotated about the horizontal axis 34, 34' through the same angles as box 9 about axis O.

When the arm 5 is lowered the disc 20, which is stopped as described above, stops in its turn pulley 29 through the medium of a pair of studs 35. The pulley 29 thus rotates with respect to casing 6 as the same is driven by the gunner following the airplane through his glass 11. The movement of the pulley 29 is transmitted by the belt 31 or preferably by a positive drive such as a sprocket chain to pulley 30 and thence to the bevel gear-wheel 32. On account of the fact that the pinion 33 at the same time is rotated through the same angle about the vertical axis 12, 12' by the box 13, it does not rotate about the horizontal axis 34, 34' and remains in a fixed direction in space.

Meanwhile, spring 19' is tensioned, so that when the released arm 5 is brought back to its upper position by the action of the tensional spring 23 the bevel quadrant 33 is rotated about axis 34, 34' so that it comes again into parallelism with the longitudinal axis of box 9.

A threaded rod 36 the geometric axis of which intersects with axis 34, 34' at a right angle in point A is mounted in box 13 rigid with pinion 33. This screw rod 36 can be controlled during rotation by the manipulation of a hand wheel 37 actuating through a pair of bevel gears. This rotation of screw rod 36 causes the longitudinal displacement of a nut 38 on this rod which nut carries an extension 96 the axis of which cuts the axis of rod 36 at a point B in the nut and which extends from this point B parallel to axis 34, 34', toward the interior of box 13 in order to cover at a point B1 in the vertical plane passing through axis 12, 12' perpendicularly to axis 34, 34'. A rod 39 is mounted so as to turn around extension 96 in such a manner that its axis passes through point B1, and can turn around this point B1, in a vertical plane passing through axis 12, 12' perpendicular to axis 34, 34'. This rod 39 is on the other hand held in a vertical groove of a member 40 which itself has a groove receiving the wall of box 13 to be able to slide horizontally in the direction perpendicular to axis 34, 34'. Rod 39 the axis of which remains always vertical terminates in its upper part in a Cardan joint having its center on the vertical axis of this rod at a height equal to the height of point O above axis 34, 34', i. e., if one denotes with A1, the intersection of axis 34, 34' and 12, 12', a point $m_0$ is defined by $B1m_0 = A1O$. The quadrilateral A B B1 A1 is obviously a rectangle and the quadrilateral A1 B1 $m_0$ O in which opposite sides A1, O and B1, $m_0$ are vertical and equal is a parallelogram. Quadrilateral A1 B1 $m_0$ O is also a parallelogram and as a result vector $\overline{Om_0}$ is parallel and equal to A1 B1. Rod 39 is provided at its upper end with a universal joint having a point $m_0$ for its centre, and the vertical distance between said point and the axis of the cylindrical portion of nut 38 is equal to the vertical distance between point O and the horizontal axis 34, 34', so that shown as projected on a side plane (Fig. 4) the axes O, 34 and 38 and the point $m_0$ form a deformable parallelogram.

Mounted within the side extension 7 of the casing 6 is a clockwork 43 which, once set into action by the lowering of arm 5 acting through the medium of lever 44, imparts a uniform movement to a pinion 45 (Figs. 7 and 10). Mounted on the shaft of said pinion is a toothed wheel 46 (Fig. 10) meshing with a tangential screwthread rigid with a worm shaft 48. Slidably mounted on the latter is a nut 49 the displacements of which consequently are proportional to time. Said nut is formed with a horizontal bore in which two nested shafts 50, 51 are adapted to rotate, in addition to which same can travel in a longitudinal slot parallel to the worm shaft 48 (Fig. 6).

The shaft 50 terminates in a bevel pinion 52 while shaft 51 ends in a fork between the legs of which a bevel pinion 53 is secured which is rigid with a sleeve 54 and meshes with the pinion 52. The fork and sleeve provide a universal joint having its centre at $m_t$ (Fig. 5). Projecting through sleeve 54 is a rod 55 attached at point $m_0$.

From the arrangement described it follows: On one hand that the virtual vector $\overline{Om_0}$ (Fig. 4) lies in the projection of $\overline{Om_t}$ as long as the arm 5 is in its upper position. When the arm is lowered $\overline{Om_0}$ remains in space in a fixed position which is independent of the movements of the glass 11 (Fig. 7); on the other hand that the operation of the hand-wheel 37 causes the variation of the length $\overline{Om_0}$ which is made proportional to $D_0$ (Fig. 3).

Inasmuch as $\overline{Om_0}$ is proportional to $D_0$ and has the direction of the sight line, the lowering of $m_0$ below the horizontal through O is proportional to the altitude $y$ of the airplane. The vertical displacement of the rod 39 consequently is proportional to said altitude; said rod carries a rack which meshes with a pinion 41 rigid with a drum bearing an altitude scale.

Figure 8:
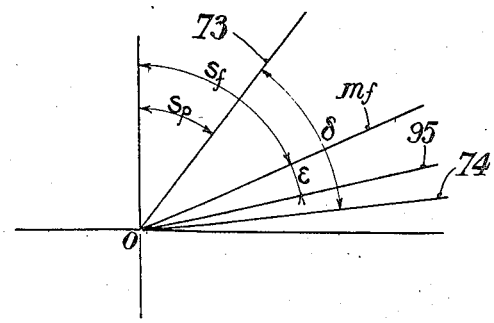
Figure 8 is an explanatory diagram.

By comparing Fig. 3 with Figs. 5 and 8 it will be seen that:

1. The optical axis of the sighting glass must be parallel to $\overline{m_0 m_t}$.

2. The angle between $\overline{m_0 m_t}$ and $\overline{Om_t}$ must give the angular settings to be transmitted to the arm inclusively of the range correction.

With that twofold purpose in view (Fig. 10), the axes 50 and 51 are provided at their respective ends within the box 9 with a pair of links 56, 57 carrying at their ends a pair of journalled sleeves 58, 59 adapted to slide on a pair of rods 60, 61 parallel to the axis of the box 9. Said rods 60, 61 are hinged at the ends of links 62, 63 on one hand, 64 and 65 on the other hand, which are mounted in bearings carried by the box 9.

Said links are all of the same length, so that they provide a pair of fulcrumed deformable parallelograms one of which rotates through the same angle as shaft 50 and the other through the same angle as shaft 51.

The trunnions 66, 67 of said links 63, 62 project outside of box 9 into the sleeve formed by arm 10 (Fig. 7). The trunnion 66 carries at its end a bevel pinion 68 and the trunnion 67 a fork between the legs of which a bevel gear wheel 69 is secured which meshes with pinion 68, the wheel 69 having twice as many teeth and rigid with a prism 70.

Carried at the respective ends of the trunnions 71 and 72 of links 64 and 65 are a pair of spur gears 73 and 74 arranged in the lateral extension 7 of the casing 6.

When the angle between $\overline{m_om_f}$ and $\overline{Om_f}$ varies, the sleeve 54 rotates about point $m_f$, which results in the rotation either of shaft 50 or of shaft 51 or of both. The pair of fulcrumed deformable parallelograms above mentioned are rotated respectively through the same angles as said shafts, which results in the rotation of the link trunnions.

The rotation of trunnion 67 causes the prism 70 to rotate about the axis of arm 10, the rotation of trunnion 66 results in the rotation of prism 70 about an axis perpendicular to 66, the simultaneous rotation of trunnions 66 and 67 results in the rotation of prism 70 about the point 75 and the last mentioned rotation causes the sight line 76 to rotate through an angle $\beta$ which is equal to the angle between $m_om_f$ and $Om_f$.

The rotation of trunnions 71 and 72 cause the pinions 73, 74 to rotate through the same angles as the shafts 50 and 51. From these rotations there will be subtracted the values of the angle of correction in departure and position once the value of the angle of sight is added as explained hereinafter.

The box 9 is provided at its lower portion with a bore having a circular horizontal axis H parallel with the axis O and so positioned that the plane OH that contains both of them shall be parallel with the axis of the box 9, with the result that the line OH in the plane at right angles to said axes in Fig. 9 is parallel to the line of elevation of the future airplane position when the glass 11 is aimed at the present airplane. The said horizontal bore receives a centering device carried by a box 77 (Fig. 9). Said box is connected to the lateral projection 7 by a link 78, 79 (Fig. 6) the length of which is taken equal by construction to the distance OH and the axes 78, 79 of which are located respectively in such manner that the points O, H, 78, 79 provide the vertices of a deformable parallelogram. The box 77 thus remains constantly parallel to itself and particularly the worm shaft 80 carried thereby remains constantly vertical. Said worm shaft 80 driven by the operation of a hand-wheel 81 causes the displacement of a nut 82 (Fig. 9) which carries a stud located vertically below H and engaging a longitudinal slot in an arm 83 swingable about the horizontal axis O (Fig. 9). By comparing Fig. 9 with Fig. 2 it will be appreciated that in order to set the arm 83 in the direction in which the firearms must be aimed it is necessary to displace the said arm angularly, in the plane of Fig. 9 which is at right angles to the axis O and with respect to the axis of the box 9 which is represented in the said figure by the line OH, an amount $\epsilon$ which is equal to the sight elevation corresponding to the distance $D\epsilon$ of the future airplane position. In the application of the principle diagrammatically shown in Fig. 2 this result can be obtained by setting distance graduations on nut 82, an index being secured in front thereof on box 77 (such graduations would be auxiliary graduations). In practice, nut 82 is formed with a longitudinal slot 84 and box 77 with a horizontal slot 85. A stud 86 has a sliding fit in said slots; every distance D corresponds to a particular position of stud 86 which thus travels in the horizontal through H as distance AH varies. The shape of the slot 84 is such that the horizontal distance H—86 be proportional to D (Figs. 11 and 12). The stud 86 is connected to a deformable fulcrumed parallelogram having pivot points 87, 88, 89, 90 secured in the cover of box 9 and constantly urged to collapse by the action of a spiral spring 91 (Fig. 11).

The parallelogram being arranged in such manner that the pivot points 88, 89 remain at all times parallel to OH, the distance between the axes 88, 89 and the axis OH is proportional to the altitude Y of the airplane; the rotation of link 89, 90 is a function of the altitude; such rotation is transmitted through the medium of a sector 19 and a pinion 92 to a drum 93 provided with an altitude scale which moves past a window 94 in box 9.

The direction of the present airplane position and the direction to be given to the axes of the guns thus being materialized respectively by the two arms 55 and 83, there remains to determine the drift and the quadrant elevation components of the angle between the two said directions, the said components respectively providing the drift and the quadrant elevation corrections to be accounted for in the aiming of the firearms at the target.

Let $\delta$ be the drift correction, which is equal to the angle between the projections on a horizontal plane of the arm $m_om_f$ and of the axis of the box 9.

On the other hand the correction of the position angle is equal to the difference between the angles of inclination to the horizontal plane of the two arms 55 and 83. If one denotes by $S_p$ and $S_f$ the position angles of the aerial target and of the future aerial target and of $\epsilon$ the angle of increase as it has been defined in referring to Fig. 9 these two angles of inclination are respectively $S_p$ and $S_f+\epsilon$ in such a manner that the correction of the position angle itself is $S_f+\epsilon-S_p$.

These two corrections are obtained in the extension 7 in which, between pinions 73 and 74 mentioned above, an identical pinion 95 is arranged with its barrel keyed on arm 83. The diagram Fig. 8 indicates what the rotations of these various pinions signify.

A planet wheel 98 mounted on an arm 99, in combination with the pair of pinions 73 and 95, provides a differential gear set which causes the arm 99 to rotate by an amount equal to the difference in the rotations of pinions 73 and 95, that is, equal to $S_f+\epsilon-S_p$.

Either arm 97, 99 is provided with a drum carrying a "departure" and a "position" scale, respectively, which move past windows 100 in extension 7.

The employment of the fire-control apparatus according to this invention, in addition to the gunner who sights and follows the airplane through the glass by acting upon lever 5 and arm 10 and to the one who reads and transmits the values of the departure and position he sees in the windows 100 to the artillery-men, necessitates an additional operator the function of whom is as follows:

The rod 55 intersects an angle $S_p$ with the horizontal plane. The rod 55 is inclined to the horizontal plane at an angle $\delta$. Said rod rotates the shaft 51 an angle also equal to $S_p$. The trunnion 71 is imparted with the same rotational movement as the shaft 51, with the result that the pinion 73 keyed on the end of said trunnion 71 is also rotated an angle $S_p$ as diagrammatically shown in Fig. 8. On the other hand, pinion 74 is moved angularly the same amount as shaft 50. Now, the latter sums up two angular displacements, of which the one $S_p$ is that of the shaft 51 and the other $\delta$ is that of the pinion 53, so that its total angular displacement is $S_p+\delta$. The diagram indicates the said rotation $S_p+\delta$ for pinion 74. Pinion 95 keyed on arm 83 shown in Fig. 9 is swung with respect to the position it occupies when this arm 83 is horizontal by an angle equal to the inclination of this arm 83 to the horizontal plane such as $S_f+\epsilon$ as indicated in the diagrammatical Fig. 8.

It will thus be appreciated that the angular corrections to be made in the aiming of the guns, i. e., $\delta$ and $S_f+\epsilon-S_p$ are equal, respectively, to the angular displacements on the one hand of pinions 73 and 74 and on the other hand of pinions 73 and 95. It is upon these principles that are based the mechanisms for the mechanical elaboration and signalling of the two sai dangular corrections as disclosed hereinafter.

A planet wheel 96 carried by an arm 97 in combination with the two pinions 73 and 74 provides a differential gear by means of which said arm 97 is moved angularly an amount equal to the difference in the angular displacements of pinions 73 and 74, that is, to $\delta$.

During the period the airplane is searched he operates the hand-wheel 37 with a view to index in drum 42 the altitude of the airplane, which is given by a range-finder operated by other men. During that period, the arm 5 being in its upper position the virtual vector $\overline{Om_o}$ is collinear with OH and its length is proportional to the distance of the airplane. At that time point $m_t$ is at O and, as the length of vector $Om_t$ is nil, the sleeve 54 is parallel to OH as well as the line of sight 76 of the glass 11.

When the sighting man sees the airplane at the sighting centre of glass 11, taking its position as an initial position of reference, he lowers the arm 5, which results in making the direction of vector $\overline{Om_o}$ fixed and independent of the movements of the apparatus and to set the clockwork 43 into action, thus initiating the displacement of point $m_t$. The operator then releases the hand-wheel 37, thus allowing the length of $\overline{Om_o}$ to retain a value proportional to $D_o$, and he operates the hand-wheel 81 with a view to index the altitude of the airplane on drum 93. In this manner he gives the correct angle of sight.

The fire-control apparatus then continues to give correct sight and position data as long as the course of the airplane remains unchanged. If the course happens to change or when the point $m_t$ comes to the end of the travel allowed by the apparatus the sighting man releases the arm 5 which takes again its upper position, with the result on one hand to bring the virtual vector $\overline{Om_o}$ back in line with OH and on the other hand, as the clockwork is restored to zero, to bring point $m_t$ back to point O.

The line of sight 76 assumes a new direction parallel to OH, ready for a new determination of the corrections.

I claim:

1. A fire-control apparatus for direct aiming anti-aircraft fire-arms comprising means to materialize a first fixed vector directed toward an initial position of the aerial target and the length of which is proportional to the distance to said target at the zero time of the passage of this aerial target to the initial position, means materializing a second vector free in direction, a clockwork rendering the length of the second vector automatically proportional to the time elapsed from the zero time, sighting means materializing a sight line, mechanical means controlling the sighting means to maintain the direction of the sight line parallel to the sum of the vectors, an arm swingable about an axis perpendicular to the second vector and materializing a third vector disposed in a vertical plane parallel to the second vector, a hand-operated means for swinging this arm and for giving the third vector an upward swing with respect to the second vector equal to the height angle corresponding to the distance of the target, a box having two windows, two graduated drums pivotally mounted in the box, mechanical connections controlling the rotation of one of these drums so that the readings of these drums through the windows indicates an angular swing in horizontal projection, the other the difference of the inclinations to the horizontal plane of the third vector to the sum of the first two vectors, the aiming of the sighting line on the target at an instant later to the zero time having in an apparatus of this construction the effect that one of the graduations read through the windows indicates an angular swing in horizontal projection, the other the difference of the inclinations to the horizontal plane between the direction to be given to the fire-arms for aiming at the target in that instant subsequent to the initial instant and the sighting line on this target in the same instant later than the zero time.

2. A fire-control apparatus for direct aiming anti-aircraft fire-arms comprising a pedestal, a table mounted on the pedestal for pivoting about a vertical axis, the table having on one side of the vertical axis a circular extension and carrying on the other side of the vertical axis a vertical box, having two windows and carrying a bearing the horizontal axis of which meets the vertical pivot axis of the table, an oscillating box having a lateral centering recess and being mounted by the centering lateral recess on the bearing of the vertical box, the oscillating box having a longitudinal slot and carrying a tubular lateral arm, a telescope on the tubular lateral arm, a movable reflecting prism in front of the telescope adapted to angularly displace the line of sight of the telescope in space, a Cardan joint mounted above the circular extension of the table, means to fix the direction and length of the vector having as an origin the center of the universal joint and as an end a point fixed on the axis of oscillation of the oscillating box in the direction of the initial position of the target and in accordance with a length proportional to the distance of the target at the zero time of the passage of this target to its initial position, a worm spindle longitudinally and pivotally mounted in the oscillating box, the axis of the worm spindle being parallel to the axis of the telescope, a clockwork mounted in the oscillating box, means transmitting the rotation of the clockwork to the worm spindle, a nut mounted on the worm spindle and displaced longitudinally by the rotation of the worm spindle, a pair of concentric trunnions mounted laterally on the nut and projecting from the oscillating box to the outside through the longitudinal slot, the common axis of these trunnions being parallel to the axis of oscillation of the oscillating box and coinciding with the axis of oscillation of the oscillating box in the original position of the nut, means for disconnecting the clockwork at the zero time, the nut being in its original position, a second and a third pair of concentric trunnions having like the first pair their axis parallel to the axis of oscillation of the oscillating box, the second pair of trunnions extending in the tubular lateral arm of the oscillating box, the third pair of trunnions having its axis coinciding with the axis of oscillation of the oscillating box and projecting from this box through the lateral centering recess of the the oscillating box to extend in the vertical box, means connecting for rotation the trunnions of the second and third pair to the pinions of the first pair, the first trunnion of the first pair terminating exteriorly of the oscillating box in a bevel pinion and the second trunnion of the first pair terminating in a fork, a sleeve pivotally mounted in the fork having an extension of the shape of a conical pinion meshing with the bevel pinion of the first trunnion of the first pair, the center of this sleeve lying in the plane perpendicular to the axis of oscillation of the oscillating box and passing through the fixed points of this axis of oscillation of the oscillating box, a rod pivoted to the Cardan joint and slidably mounted in the sleeve, means cooperating with the second trunnion pair to transmit automatically to the prism the desired movement to effect the constant parallelism of the sight line and of the rod pivoted to the Cardan joint and slidably mounted in the sleeve, an arm swingable about the axis of oscillation of the oscillating box, hand operated means to give this arm an upward inclination to the axis of the worm spindle of an angle equal to the height angle corresponding to the distance of the target, two graduated drums pivotally mounted in the vertical box, the graduation of these drums passing in front of the windows of this vertical box, and means cooperating with the third trunnion pair and with the arm swingable about the axis of oscillation of the oscillating box to transmit automatically to the two graduated drums rotating movements in such a manner that of the two drums one indicates constantly an angular movement in horizontal projection, the other difference of inclination to the horizontal plane of the rod pivoted on the Cardan joint and slidably mounted in the sleeve and the arm swingable about the axis of oscillation of the oscillating box.

3. A fire control apparatus for direct-aiming anti-aircraft firearms according to claim 2, the vector having its origin in the center of the Cardan joint and as an end the fixed point on the axis of oscillation of oscillating box coinciding prior to the zero time in direction with the axis of the worm spindle mounted longitudinally pivotally in the oscillating box in such a manner that the aiming of the line of sight on the target results in directing this vector on the present position of the target and means permitting at the zero time, to change the direction of this vector from the axis of the worm spindle longitudinally pivotally mounted in the oscillating box to fix its direction to the direction at the zero time and to give it manually a length proportional to the distance of the target at that zero time.

4. A fire control apparatus for direct-aiming anti-aircraft firearms according to claim 3 wherein the means whereby at the time elected as the zero time the said vector can be set directionally free from the axis of the worm spindle, fixed in space in its actual direction and adjusted by hand in its length in direct dependency on the range of the target at said zero time consists of a box, disc clutch mechanisms housed in said box, spiral springs counteracting the disconnecting movement and assisting the return to the connected condition, a worm spindle, a hand-operated member to rotate said spindle, a nut on said worm spindle movable as a result of the actuation of the hand-operated member in such a manner that it can be moved lengthwise of the same in dependency on the distance elected as the actual range of the target and a vertical rod carried by the nut and the upper end of which carries the Carden joint.

5. In a fire control apparatus for direct-aiming anti-aircraft firearms according to claim 4 wherein the vertical rod is formed with a rack, the provision of a pinion meshing with said rack, a graduated drum cooperating with a reference mark and rotated through the medium of said pinion in direct relation with the altitude of an aerial target that would be positioned on the axis of the worm spindle at the distance defined by the position of the nut on said spindle, so that the setting of the nut on the spindle can be effected by so manipulating the hand control member that the mark on the graduated drum which indicates the altitude elected as the altitude of the target at the zero time comes into register with the reference mark.

6. A fire control apparatus for direct-aiming anti-aircraft firearms according to claim 2 wherein the first pair of trunnions carry links of equal length at their ends received in the oscillating box, the second pair of trunnions carry links of equal length at their ends received in the oscillating box and the means to rotationally interconnect the trunnions belonging to the second and the third pair with those belonging to the first pair consisting of a pair of bars to which the links connected with the first pair of trunnions and those which are connected with the second pair of trunnions are pivoted respectively.

7. A fire control apparatus for direct-aiming anti-aircraft firearms according to claim 2 wherein the arm swingable about the axis of oscillation of the oscillating box is provided with a longitudinal slot, the said oscillating box being provided at its lower side with a lateral bore the axis of which is parallel with the axis of oscillation of the oscillating box and is located in the plane parallel with the axis of the worm spindle through the axis of oscillation of the oscillating box and the hand-operated means to angularly displace the arm swingable about the axis of oscillation of the oscillating box upwards an amount equal to the sight elevation corresponding to the range of the aerial target consisting of a box provided with a center engaged in the lateral bore in the oscillating box, a link connecting said box with a point on the table in such a manner that said box remains fixed with respect to the vertical, a vertical worm spindle pivotally mounted in said box, hand-operated means to angularly displace said vertical worm spindle, a nut on the latter movable lengthwise of the same by the action of said hand-operated means, a stud carried by the lower portion of said nut, located in the vertical plane through the axis of the lateral bore in the box and projecting through the longitudinal slot in the arm swingable about the axis of oscillation of the oscillating box, a height-indicating drum rotatable with respect to a reference mark and means cooperating with the movement of the nut lengthwise of the vertical worm spindle adapted to collineate the reference mark with the graduation that indicates the altitude of a target that would be located in the direction of the axis of the longitudinal worm spindle of the oscillating box at the distance corresponding to the sight elevation given by the position of the nut on the vertical worm spindle in such a manner that the desired positioning of the arm swingable about the axis of oscillation of the oscillating box can be performed by operating the hand-operated means allowing to angularly displace the vertical worm spindle so as to collineate the reference mark with the graduation on the height-indicating drum that represents the value adopted as the future altitude of the aerial target.

8. A fire control apparatus for direct-aiming anti-aircraft firearms according to claim 7 wherein the center of the box provided with such a center has a horizontal slot cut therein that extends from the axis of said center and the nut on the worm spindle is formed with a curved slot so shaped that the distance from the axis of the center to the point of intersection of the median lines of either slot, irrespective of the position of the nut on the vertical worm spindle, remains proportional to the distance corresponding to the sight elevation given by the position of said nut on said vertical worm spindle, the means cooperating with the movement of the nut on the vertical spindle and whereby the graduation on the height indicating drum which indicates the altitude of a target that would be located on the extended axis of the longitudinal worm spindle of the oscillating box at a distance corresponding to the sight elevation defined by the position of the nut on the vertical spindle is set into register with the reference mark consisting of a stud projecting through the horizontal slot in the center and the curved slot in the nut, a pair of pivots on the oscillating box having their axes located in the plane through the axis of oscillation of the oscillating box parallel with the axis of the longitudinal worm spindle of said box and which are parallel with said axis of oscillation, a pair of links equal in length rotatably mounted on said pivots, a rod pivoted at either end thereof to said links, resilient means acting on the one of said links urging said link to swing parallel with the axis of the longitudinal worm spindle of the oscillating box, the stud projecting through the horizontal slot in the center and through the horizontal slot in the nut engaging the rod pivoted at either end thereof to the said links and means to transmit the rotational movement of one of the links to the height-indicating drum carried by the oscillating box.

9. A fire control apparatus for direct-aiming anti-aircraft firearms according to claim 7 wherein the means cooperating with the third pair of trunnions and with the arm swingable about the axis of oscillation of the oscillating box to transmit such angular displacements to the pair of drums pivoted in the vertical box that said drums will permanently indicate the one the angular spacing in projection and the other difference of inclination with respect to the horizontal plane on the one hand of the rod pivoted to the Cardan joint and slidably received in the sleeve and on the other hand of the arm swingable about the axis of oscillation of the oscillating box consist of a shaft keyed on said swingable arm coaxial with the axis of oscillation of the oscillating box and projecting out of the latter through the hollow center of the same into the vertical box, three pinions in the latter keyed respectively on the ends of the two trunnions of the third pair and on the shaft keyed on said swingable arm, a first planet gear wheel meshing simultaneously with the pinions keyed respectively on the ends of the two trunnions of the third pair, a second planet gear wheel meshing simultaneously with the pinions keyed respectively on the end of the second trunnion of the third pair and the end of said shaft keyed on said swingable arm and means to transmit the angular displacement of the shafts of either planet gear wheel respectively to the one and the other graduated drums pivoted in the vertical box.

10. A fire control apparatus for direct-aiming anti-aircraft firearms according to claim 2 and wherein the means cooperating with the second pair of trunnions for automatically transmitting to the prism the movement derived for effecting the constant parallelism of the line of sight and the rod pivoted to the Cardan joint and mounted slidably in the sleeve is constituted by a fork terminating in the second trunnion to support the prism pivotally mounted in the fork, a conical pinion splined to the extremity of the first trunnion and another bevel pinion rigid with the prism and having a number of teeth double the number of teeth of the pinion splined at the extremity of the second trunnion of the second pair and meshing with the latter bevel pinion.

GEORGES PIERRE ANDRÉ ALLEC.

REFERENCES CITED

The following references are of record in the file of this patent:

UNITED STATES PATENTS

| Number | Name | Date |
| --- | --- | --- |
| 1,211,400 | Burns | Jan. 9, 1917 |
| 1,651,093 | LePrieur | Nov. 29, 1927 |
| 1,784,929 | Estoppey | Dec. 16, 1930 |
| 1,962,590 | Haubroe | June 12, 1934 |
| 1,997,303 | LePrieur | Apr. 9, 1935 |
| 2,052,845 | Raaber | Sept. 1, 1936 |
| 2,105,147 | Inglis | Jan. 11, 1938 |
| 2,237,613 | Petschenig | Apr. 8, 1941 |
| 2,264,662 | Donitz | Dec. 2, 1941 |
| 2,438,532 | Barth | Mar. 30, 1948 |
| 2,441,147 | Haubroe | May 11, 1948 |

FOREIGN PATENTS

| Number | Country | Date |
| --- | --- | --- |
| 131,086 | Great Britain | Aug. 21, 1919 |
| 374,930 | Great Britain | June 16, 1932 |
| 607,188 | Germany | Dec. 19, 1934 |
| 840,363 | France | Jan. 16, 1938 |
| 859,265 | France | June 3, 1940 |